May 3, 1949.  A. DUNN ET AL  2,468,964
HYDRAULIC TRANSMISSION
Filed Jan. 5, 1946  2 Sheets-Sheet 1
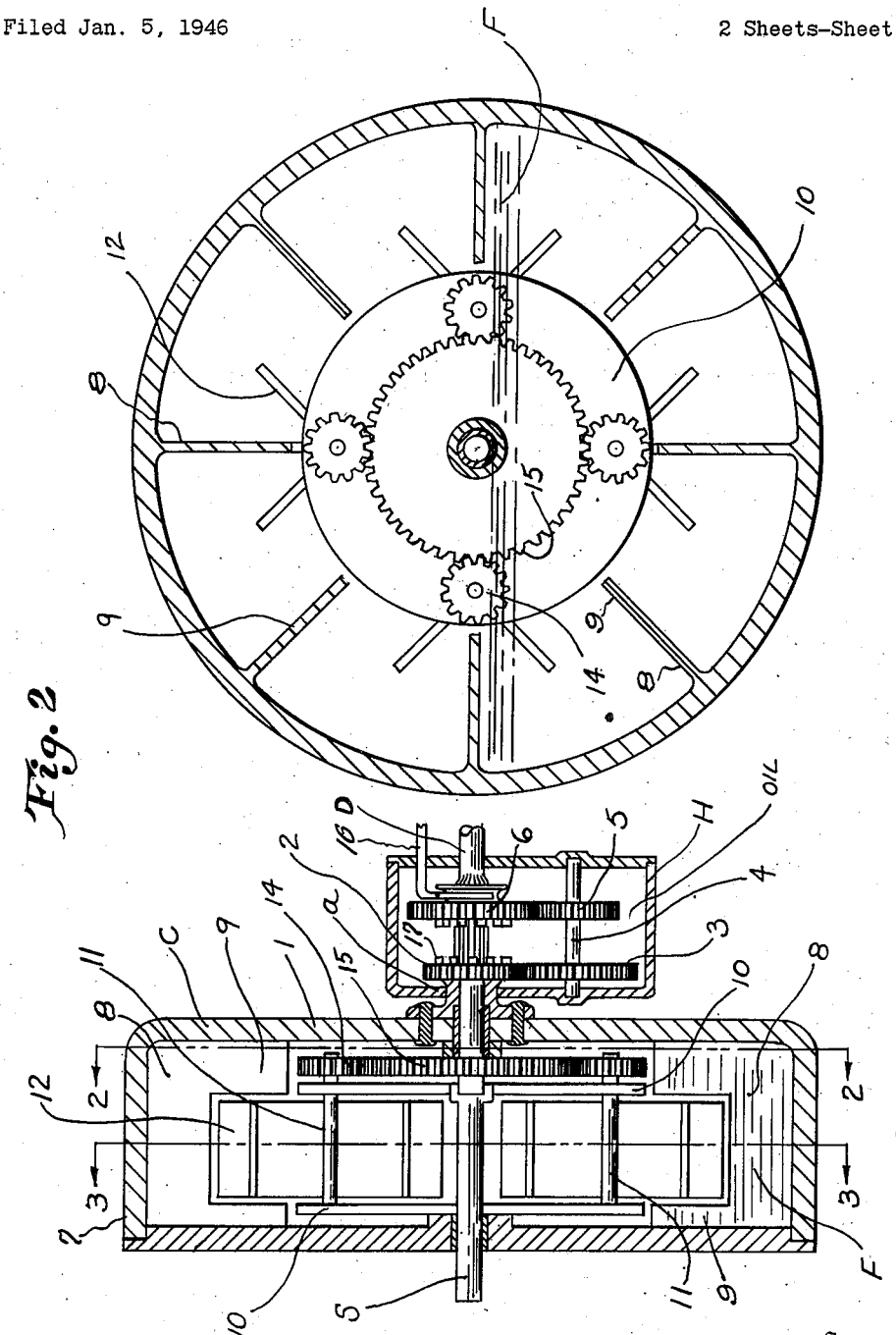
Inventor
Albert Dunn
and
Odus C. Eiland
By
Attorney May 3, 1949.  A. DUNN ET AL  2,468,964
HYDRAULIC TRANSMISSION Filed Jan. 5, 1946  2 Sheets-Sheet 2

Inventor
Albert Dunn
and
Odus C. Eiland

By Wilfred E. Dunn
Attorney

Patented May 3, 1949

2,468,964

UNITED STATES PATENT OFFICE 2,468,964

HYDRAULIC TRANSMISSION

Albert Dunn and Odus C. Eiland,
Mount Rainier, Md.

Application January 5, 1946, Serial No. 639,322

5 Claims. (Cl. 74—720)

This invention relates to a hydraulic transmission and it is primarily an object of the invention to provide such a mechanism including a clutch of an over-running type and also one which permits rotation of the driving shaft when the driven shaft is subjected to overload as may result from added work or excessive drag.

It is also an object of the invention to provide a mechanism of this kind comprising a driving shaft and an aligned driven shaft and upon which shafts is mounted for independent rotation therearound an enclosed casing which is driven by the driving shaft at a greater speed of rotation than the driving shaft, together with means within the casing whereby, as a result of the action of a fluid within the casing, the driven shaft will be operated with such variation in speed with respect to the driving shaft as may result from overloading the driven shaft.

It is a still further object of the invention to provide a mechanism of this kind comprising a driving shaft and a driven shaft aligned one with respect to the other, together with a casing mounted on said shafts for rotation therearound and wherein the casing is driven by the driving shaft at a speed in excess of the speed of rotation of the driving shaft, together with rotating vanes within the casing carried by the driven shaft and rotated by the driving shaft, said vanes being subjected to the action of a fluid within the casing to effect unitary rotation of the driving shaft and driven shaft.

The invention consists in the details of construction and in the combination and arrangement of the several parts of our improved hydraulic transmission whereby certain important advantages are attained, as will be hereinafter more fully set forth.

In order that our invention may be the better understood, we will now proceed to describe the same with reference to the accompanying drawings, wherein:

Figure 1 is a vertical sectional view of somewhat of a diagrammatic character illustrating a transmission constructed in accordance with an embodiment of the invention, certain of the parts being in elevation;

Figure 2 is a sectional view taken substantially on the line 2—2 of Figure 1.

Figure 3:
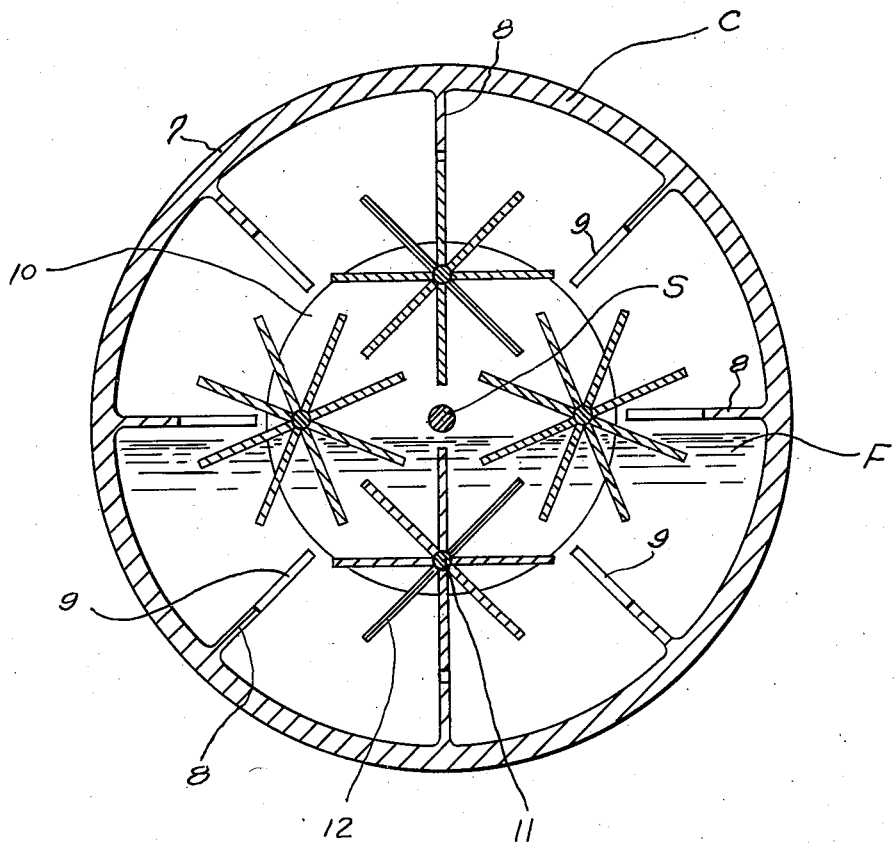
Figure 3 is a sectional view taken substantially on the line 3—3 of Figure 1.

As illustrated in the accompanying drawings, D denotes a driving shaft operated from any desired source of power and which is aligned with a suitably mounted driven shaft S.

Freely mounted on the adjacent or opposed end portions of the shafts D and S is a closed casing C of required dimensions and which contains a charge F of fluid which, when the casing C is at a standstill, fills substantially one-half the casing. We do not, however, wish to be understood as limiting ourselves to any exact quantity of fluid as such amount may be varied as desired.

The head 1 of the casing C through which the shaft D passes at the axial center thereof has fixed therewith an outstanding bearing $a$ for the shaft 1. This bearing $a$ extends within an adjacent gear housing H, rigidly supported in any desired manner within the housing H. Fixed to this bearing $a$ for rotation therewith is a pinion or gear 2 which constantly meshes with a larger pinion or gear 3 rotating with an idler shaft 4 supported within the housing H parallel with the shaft D.

The shaft 4 also fixedly carries a second pinion or gear 5 which meshes with a pinion or gear 6 keyed to the driving shaft D for rotation therewith but having movement longitudinally thereof. The ratio of these pinions or gears 6, 5, 3 and 2, and particularly of the pinions or gears 2 and 3, is such that the casing C may be caused to rotate at a speed faster than the speed of rotation of the shaft D, said increased speed being preferably substantially 25 per cent although this may be varied as the requirements of practice may deem more expedient.

The casing C is cylindrical in form and the peripheral wall 7 thereof is provided thereacross and at suitably spaced points circumferentially therearound with the inwardly directed, fixed vanes or blades 8, the extremities of which are continued by the inwardly and radially disposed supplemental blades 9.

The end portion of the shaft S within the casing C has fixed thereto the spaced disks 10. The peripheral portions of the disks 10 at equidistantly spaced points therearound rotatably support the shafts 11 which bridge the space between the disks 10. Each of the shafts 11 carries the outstanding and radially disposed vanes 12 fixed to the shafts 11. The number of vanes may be varied as preferred and it is to be noted that the vanes carried by the shafts 11 are of the same number. The shafts 11 extend beyond the disk 10 opposed to the head 1 of the casing C and said extended portions of the shafts 11 have fixed thereto the planetary gears 14 which constantly mesh with a large sun gear 15 fixed to the inserted end portion of the shaft D within the casing C.

The pinion or gear 6 is adapted to be shifted in any preferred manner, as indicated at 16 and the opposed faces of the gears and pinions 2 and 6 are provided with coacting clutch elements or teeth 17 which may be made to interlock upon shifting of the pinion or gear 6 toward the pinion or gear 2. During the period of interlocking of the gears or pinions 2 and 6, the gear or pinion 6 will be entirely free of the gear or pinion 5 and the shaft D and the casing C will be connected for unitary rotation.

When the gear or pinion 6 is shifted to its outer position, as illustrated in Figure 1, it meshes with the gear or pinion 5 and the casing C is rotated through the gears or pinions 3 and 2 but at an axial speed greater than that of the shaft D.

Upon starting the shaft D or when the shaft D is idling, the resultant agitation of the fluid F within the casing C will not offer sufficient resistance to the shafts 11, which are revolving anticlockwise, to effect rotation of the shaft S. However, as the speed of the shaft D increases, the resultant centrifugal action upon the fluid will cause the fluid to coact with the blades or vanes 8 and 9 of the casing and the vanes 12 to resist the anticlockwise rotation of the vanes 12. The greater the speed of the shaft D, the greater the resistance to the vanes 12, the faster the rotation of the driven shaft S. When the fluid resistance to the anticlockwise turning vanes 12 bring such movement to a stop, the speed of the shafts D and S will be the same or the shaft S will be at high speed.

It is believed to be apparent from the foregoing that when the shaft S is subjected to overload, as may result from excessive drag, added work or any other cause, no hindrance or obstruction will be offered to the continued rotation of the shaft D.

It is also believed to be apparent that the vanes 12 yield such leverage in their action of retarding the pinions or gears 14 with respect to the gear 15 that the driven or output shaft S may be given a working speed that will not slip beyond the intended degree under variations of load on the shaft S.

When the resistance to the anticlockwise rotation of the vanes 12 is beyond that degree to hold the vanes against such anticlockwise resistance, the vanes 12, together with the pinions or gears 14, will rotate clockwise and the resultant riding of the planetary gears 14 around the sun gear 15 will result in an increased rotation of the shaft S.

We claim:

1. A hydraulic transmission, comprising a drive shaft, a driven shaft in alignment therewith, a circular fluid container mounted upon and concentrically with the two shafts, a bearing secured to the container and having the drive shaft passing therethrough and rotatable therein, a plurality of groups of rotatable vanes supported within the container upon and secured to the driven shaft to travel therewith in a circular path, a plurality of radially inwardly extending fixed blades carried by and within the container across the rotating groups of vanes outwardly of the path of travel thereof and extending radially inwardly at opposite sides of the groups, a sun gear secured to the drive shaft within the container, a plurality of planetary gears meshed with said sun gear and each connected with a group of vanes to impart rotation thereto from the sun gear, a gear secured to said bearing and rotatable freely about the drive shaft, and a speed change gear train connected between the drive shaft and the last mentioned gear for effecting the rotation of the container at a speed different from the shaft, said container being designed to hold a fluid.

2. A hydraulic transmission of the character stated in claim 1, wherein one of the gears of said gear train is longitudinally shiftable and adapted for direct driving connection with the said last mentioned gear to establish a direct drive between the drive shaft and the container.

3. A hydraulic transmission comprising a drive shaft, a driven shaft aligned therewith, a closed container for holding a fluid rotatably mounted upon the two shafts, a plurality of rotating groups of vanes within the container mounted upon and coupled to the driven shaft to travel in a circular path with the driven shaft, an operative connection between the drive shaft and the groups of vanes to rotate the vanes in a direction opposite to the circular travel of the groups of vanes, and radially inwardly extending fixed blades carried by and within the container and extending thereacross, said fixed blades extending outwardly of the path of travel of the groups of vanes, the said operative connection between the drive shaft and the groups of rotating vanes including a gear mounted on and for rotation with the drive shaft, and means connecting the drive shaft and said container to rotate the container from the drive shaft at a greater speed than the speed of rotation of the drive shaft.

4. A hydraulic transmission comprising a drive shaft, a driven shaft aligned therewith, a closed container for holding a fluid rotatably mounted upon the two shafts, a plurality of rotating groups of vanes within the container mounted upon and coupled to the driven shaft to travel in a circular path with the driven shaft, an operative connection between the drive shaft and the groups of vanes to rotate the vanes in a direction opposite to the circular travel of the groups of vanes, and radially inwardly extending fixed blades carried by and within the container and extending thereacross, said fixed blades extending outwardly of the path of travel of the groups of vanes, the said operative connection between the drive shaft and the groups of rotating vanes including a gear mounted on and for rotation with the drive shaft, and means rotating with the drive shaft and operatively connected between the drive shaft and container to selectively effect either direct drive between the drive shaft and container or to rotate the container at a greater speed than the speed of the drive shaft.

5. A hydraulic transmission comprising a drive shaft, a driven shaft aligned therewith, a closed container for holding a fluid rotatably mounted upon the two shafts, a plurality of rotating groups of vanes within the container mounted upon and coupled to the driven shaft to travel in a circular path with the driven shaft, an operative connection between the drive shaft and the groups of vanes to rotate the vanes in a direction opposite to the circular travel of the groups of vanes, and radially inwardly extending fixed blades carried by and within the container and extending thereacross, said fixed blades extending outwardly of the path of travel of the groups of vanes, and mechanism coupling the drive shaft with the container for turning the container in the same direction as and at a faster speed than the drive shaft.

ALBERT DUNN.
ODUS C. EILAND.

REFERENCES CITED

The following references are of record in the file of this patent:

UNITED STATES PATENTS

| Number | Name | Date |
| --- | --- | --- |
| 1,568,639 | Swart | Jan. 5, 1926 |
| 2,205,329 | Wohlenhaus | June 18, 1940 |

FOREIGN PATENTS

| Number | Country | Date |
| --- | --- | --- |
| 252,568 | Italy | Mar. 25, 1927 |
| 356,798 | Great Britain | Sept. 11, 1931 |
| 546,009 | France | Oct. 26, 1922 |